UNITED STATES PATENT OFFICE.

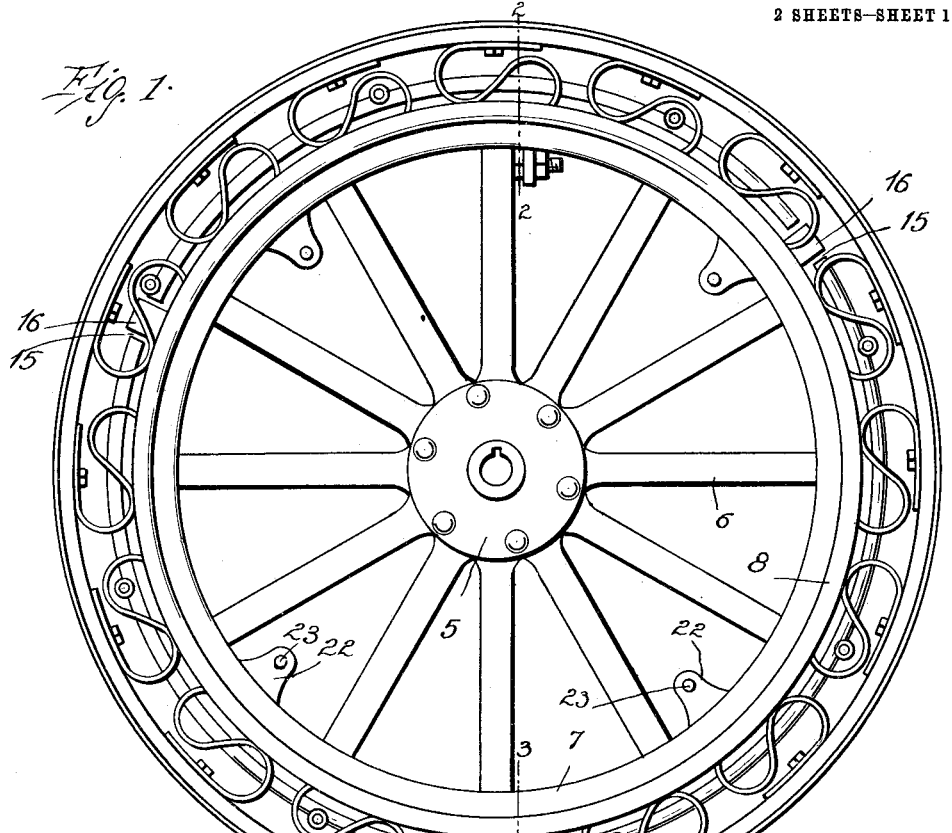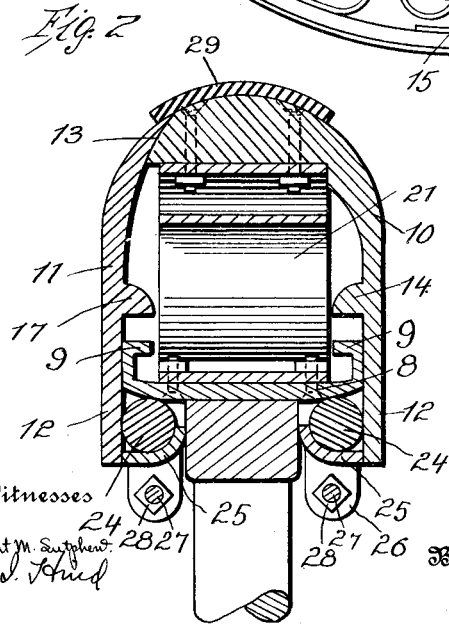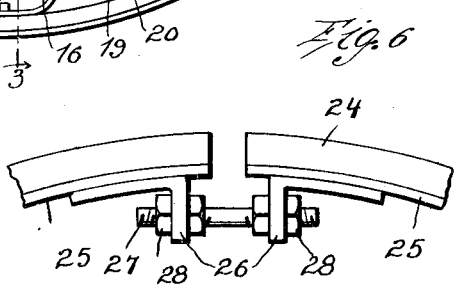

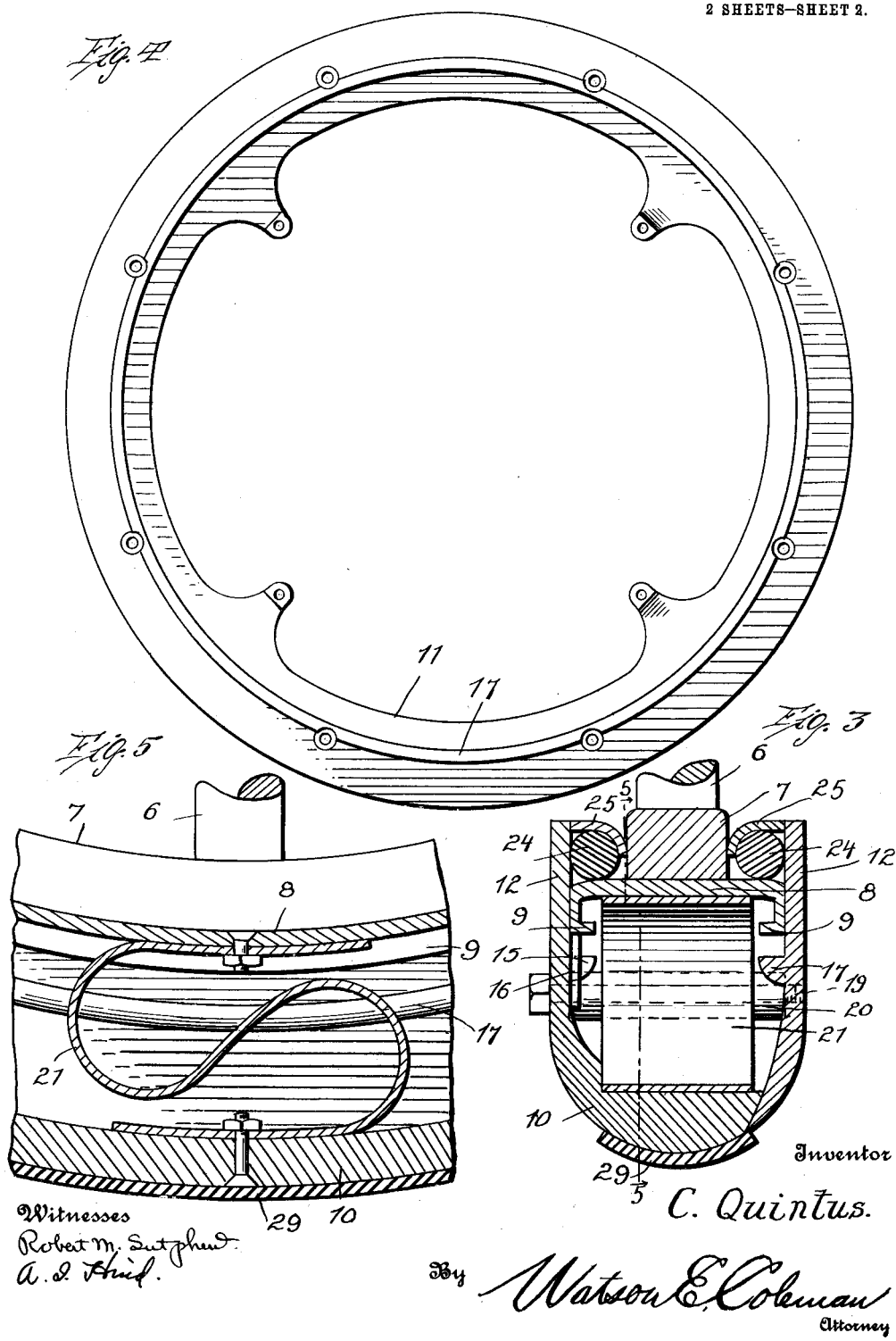

CHARLES QUINTUS, OF GARNER, IOWA.

METALLIC WHEEL-TIRE.

1,078,876. Specification of Letters Patent. Patented Nov. 18, 1913.

Application filed January 6, 1913. Serial No. 740,569.

*To all whom it may concern:*

Be it known that I, CHARLES QUINTUS, a citizen of the United States, residing at Garner, in the county of Hancock and State of Iowa, have invented certain new and useful Improvements in Metallic Wheel-Tires, of which the following is a specification, reference being had to the accompanying drawings.

This invention relates to metallic wheel tires and has for its primary object to provide an improved construction of metallic cushion tires especially designed for use on motor vehicles.

Another object of the invention is to provide a metallic tire of sectional construction and improved means for mounting said tire sections upon the vehicle wheel for movement relative to the felly thereof.

A more specific object of the invention resides in the provision of a plurality of cushioning springs arranged between the metallic tire and the felly of the wheel and improved means for limiting the circumferential movement of the wheel and thereby obviating liability of breakage of the spring members.

A further object of the invention is to provide improved means which is designed to prevent the entrance of dirt or other foreign matter to the interior of the metallic tire.

Still another object of the invention is to generally improve the construction and increase the efficiency of devices of this character, to render the same commercially more desirable without increasing the cost of production to a material extent.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation of a wheel provided with my improved tire, one of the tire plates being removed; Fig. 2 is an enlarged transverse section taken on the line 2—2 of Fig. 1; Fig. 3 is a similar view taken on the line 3—3 of Fig. 1; Fig. 4 is an elevation looking at the inner face of the cap plate of the tire; Fig. 5 is a detail longitudinal section taken on the line 5—5 of Fig. 3; and Fig. 6 is an enlarged detail view of means for expanding the packing rings.

Referring in detail to the drawings, 5 designates the wheel hub from which the usual spokes 6 radiate, said spokes being of any desired construction and number. The felly 7 of the wheel is preferably constructed of wood and upon the same the metal rim 8 is secured in any preferred manner. This rim is of greater width than the wheel felly and has its edges inwardly flanged as indicated at 9.

My improved tire includes the body or base member 10 and the cap member or plate 11. These members each include side flanges 12 which lie upon opposite sides of the wheel felly and partially inclose the same. The base or body member 10 of the tire has an outer peripheral portion of concavo-convex form to constitute the tread surface of the tire and in order to form a continuous and unbroken tread, the engaging edges of the tire members 10 and 11 are beveled as at 13 to provide a scarf joint. The base member 10 has formed upon the inner surface of its flange 12, an annular rib 14 which is notched as at 15 to accommodate lugs 16 which are secured to the metal rim 8 of the wheel and project outwardly therefrom. These lugs effectually prevent excessive circumferential movement of the tire members with relation to the felly of the wheel and thus prevent distortion or breakage of the cushioning springs which will be later referred to. The cap plate 11 of the wheel tire is also provided on the inner face of its flange 12 with a similar rib 17. This rib and the rib 14 on the body member of the tire by their engagement with the annular metal rim 8 on the wheel felly limit the compression of the cushioning springs, which will be later referred to, and thereby obviate liability of the same being broken. The flanges 12 of the tire members 10 and 11 are connected by means of a plurality of transverse bolts 19. Upon these bolts, bushings or sleeve 20 are arranged and space the base member and cap plate of the tire from each other.

A plurality of S-shaped springs 21 are arranged in spaced relation between the base member 10 of the tire and the wheel felly, said springs having their inner ends bolted to the felly and their outer ends suitably fixed to the tire base 10. These springs are substantially equivalent in width to the space between the opposed faces of the tire members 10 and 11. The flanges 12 of the tire members have inwardly projecting lugs 22 formed upon their inner edges, said lugs being apertured to receive the connecting bolts 23, which together with the bolts 19 hold the tire members in assembled relation and effectually prevent their relative transverse movement.

In order to prevent dirt and other foreign matter entering between the flanges 12 of the tire members and the metal rim 8 to the interior of the tire, I provide the packing rings 24, which are adapted to be arranged against the outer face of the projecting edges of the metallic rim and against the sides of the wheel felly. These packing rings are clamped in position by means of the expansible rings 25 which are formed with circumferential channels or grooves to receive said packing rings. These expansible rings are provided at their ends with the inwardly projecting lugs or ears 26, the same being apertured to loosely receive a threaded bolt 27. Upon this bolt the nuts 28 are threaded, said nuts engaging upon opposite sides of the ears 26. It will be apparent that by simply adjusting the nuts 28, the ends of the metallic rings 25 may be forced apart, thus expanding said rings and tightly clamping the same against the packing rings, which in turn are securely clamped against the inner faces of the flanges 12 and the edges of the metal rim 8. A rubber tread covering indicated at 29 is secured upon the tread surface of the base or body member 10 of the tire in any preferred manner.

From the foregoing, the construction and manner of operation of the device will be clearly understood. The springs 21 are of course provided for the purpose of yieldingly holding the tread portion of the wheel tire in spaced concentric relation to the wheel felly. As before stated, by providing means for limiting the circumferential movement of the tire, distortion of the springs is prevented so that their operating efficiency will not be impaired. This end is furthered by my improved packing means which prevents the entrance of mud and other foreign matter to the interior of the tire. It will be apparent that a wheel tire constructed in the manner above described will be found especially desirable upon motor vehicles and particularly upon heavy motor trucks, where strength and durability are of primary importance. The tire will, however, give satisfactory service upon light vehicles as well. As the invention includes comparatively few elements in its construction, it will be apparent that the expense incident to its manufacture will be relatively small.

While I have shown and described the preferred embodiment of the invention, it will be obvious that the same may be embodied in many other modified constructions without sacrificing any of the several advantages heretofore referred to or departing from the spirit or scope of the invention as claimed.

Having thus described the invention, what is claimed is:

1. The combination with a vehicle wheel, of a metal tire having flanges extending upon opposite sides of the wheel felly, one of said flanges being provided upon its inner face with an annular rib having a plurality of spaced notches therein, cushioning means arranged between the wheel felly and the tire, and lugs mounted upon the felly and extending into said spaced notches to limit the circumferential movement of the tire with relation to the wheel felly.

2. The combination with a vehicle wheel, of a metallic tire having flanges movable upon opposite sides of the wheel felly, the inner face of each of said flanges being provided with an annular rib, a metal rim on the wheel felly having its edges inwardly flanged, said annular ribs being normally disposed in spaced concentric relation to said rim flanges, a plurality of cushioning springs arranged between said metal rim and the tire, said ribs being adapted to engage the rim and limit the compression of said springs, the ribs upon one of the tire flanges being provided with recesses, and lugs mounted upon said metal rim disposed in said recesses to limit the circumferential movement of the tire with relation to the wheel felly.

In testimony whereof I hereunto affix my signature in the presence of two witnesses.

CHARLES QUINTUS.

Witnesses:
F. E. BLACKSTONE,
W. H. RAMSAY.